US008077543B2

(12) United States Patent
van Manen et al.

(10) Patent No.: US 8,077,543 B2
(45) Date of Patent: Dec. 13, 2011

(54) MITIGATION OF NOISE IN MARINE MULTICOMPONENT SEISMIC DATA THROUGH THE RELATIONSHIP BETWEEN WAVEFIELD COMPONENTS AT THE FREE SURFACE

(76) Inventors: Dirk-Jan van Manen, Redhill (GB); Johan Olof Anders Robertsson, Oslo (NO)

( * ) Notice: Subject to any disclaimer, the term of this patent is extended or adjusted under 35 U.S.C. 154(b) by 24 days.

(21) Appl. No.: 11/736,392

(22) Filed: Apr. 17, 2007

(65) Prior Publication Data
US 2008/0259726 A1 Oct. 23, 2008

(51) Int. Cl.
*G01V 1/38* (2006.01)
(52) U.S. Cl. .................... 367/21; 367/24
(58) Field of Classification Search ............ 367/24, 367/15, 16, 17, 18, 19, 20, 21, 22, 23
See application file for complete search history.

(56) References Cited

U.S. PATENT DOCUMENTS

| | | | |
|---|---|---|---|
| 3,283,293 A | 11/1966 | Pavey, Jr. et al. | |
| 5,723,790 A | 3/1998 | Andersson | |
| 5,754,492 A * | 5/1998 | Starr | 367/24 |
| 5,774,417 A | 6/1998 | Corrigan et al. | |
| 6,529,445 B1 | 3/2003 | Laws | |
| 6,681,887 B1 | 1/2004 | Kragh et al. | |
| 6,894,948 B2 * | 5/2005 | Brittan et al. | 367/24 |
| 7,379,385 B2 * | 5/2008 | Ferber | 367/20 |
| 2004/0042341 A1 | 3/2004 | Tenghamn et al. | |
| 2005/0013194 A1 * | 1/2005 | Vaage et al. | 367/24 |
| 2005/0018537 A1 | 1/2005 | Welker et al. | |
| 2005/0073909 A1 * | 4/2005 | Laws et al. | 367/15 |
| 2005/0160814 A1 | 7/2005 | Vaganov et al. | |
| 2005/0194201 A1 | 9/2005 | Tenghamn et al. | |
| 2005/0202585 A1 | 9/2005 | Eskridge | |
| 2006/0076183 A1 * | 4/2006 | Duren et al. | 181/121 |
| 2008/0089174 A1 * | 4/2008 | Sollner et al. | 367/21 |

FOREIGN PATENT DOCUMENTS

| | | |
|---|---|---|
| WO | WO 98/28636 | 7/1998 |
| WO | WO 00/20895 | 4/2000 |
| WO | WO2004/081583 | 9/2004 |

OTHER PUBLICATIONS

Richwalski et al., "Practical aspects of wavefield separation of two-component surface seismic data based on polarization and slowness estimates," *Geophysical Prospecting*, 48(4):697-722, 2000.

(Continued)

*Primary Examiner* — Jack Keith
*Assistant Examiner* — Krystine Breier
(74) *Attorney, Agent, or Firm* — Jeff Pyle; Kevin B. McGoff; Kevin P. McEnaney

(57) ABSTRACT

A method and apparatus implementing a technique for mitigating noise in seismic data are presented. The technique includes estimating a noise component in a set of multicomponent seismic data representing a recorded wavefield from the relationship at the free surface of an upgoing component and a downgoing component decomposed from the recorded wavefield; and removing the estimated noise component from the seismic data. The noise component can be estimated by decomposing a recorded wavefield into an upgoing component and a downgoing component and isolating a noise component in the recorded wavefield from the relationship of the decomposed upgoing and downgoing components at the free surface.

32 Claims, 9 Drawing Sheets

OTHER PUBLICATIONS van Manen et al., "Decomposition and calibration of multi-component data in the common shot domain," *Proceedings of the 66th European Association of Exploration Geophysicists Conference, Extended Abstracts*, Paper No. D026, 2004.

Amundsen, et al., Rough Sea Deghosting of Streamer Seismic Data using Pressure Gradient Approximations, Geophysics, Jan.-Feb. 2005, pp. V1-V9, vol. 70, No. 1.

PCT Search Report, dated Feb. 3, 2010 for Application No. PCT/US2008/058913.

* cited by examiner

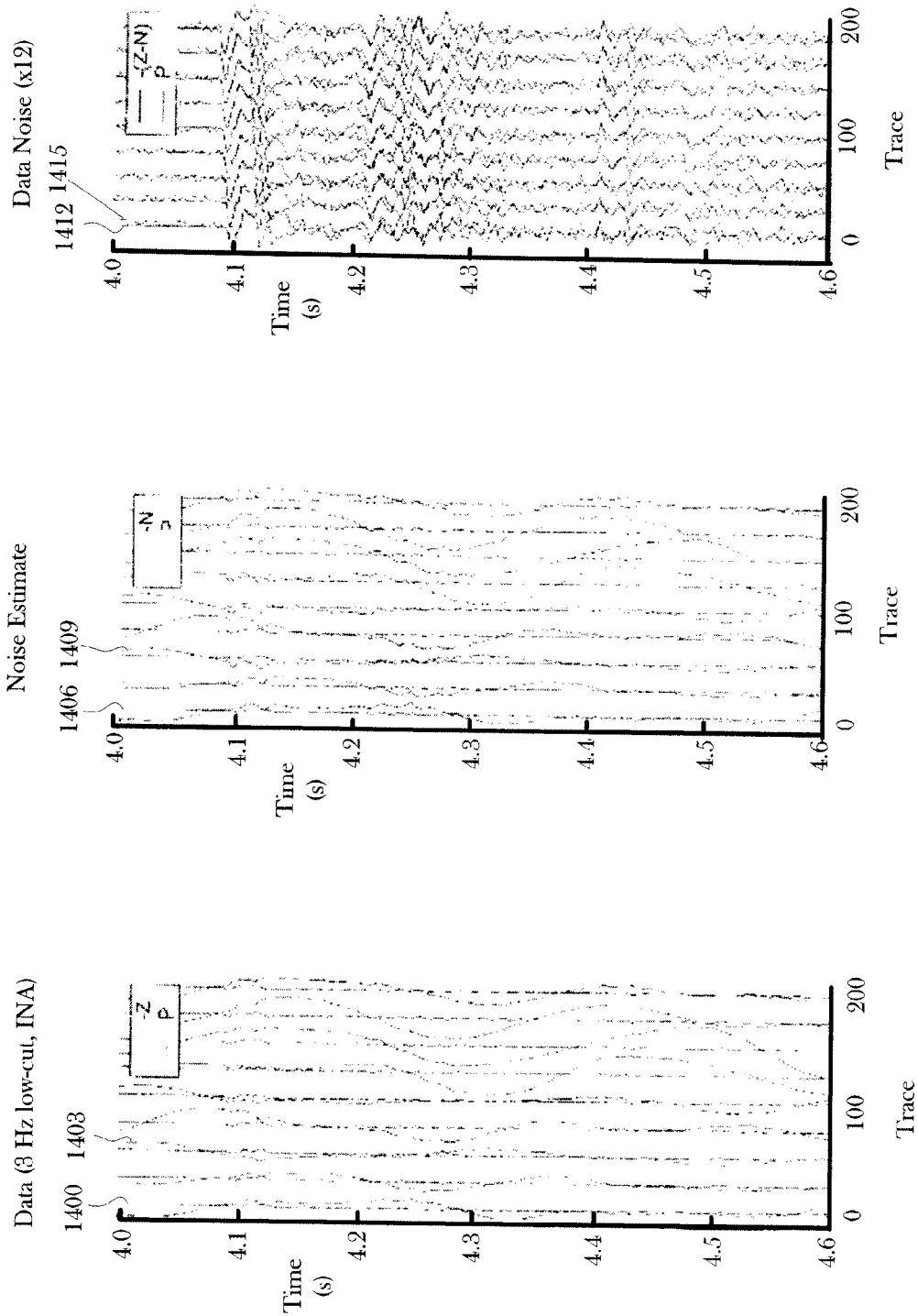

MITIGATION OF NOISE IN MARINE MULTICOMPONENT SEISMIC DATA THROUGH THE RELATIONSHIP BETWEEN WAVEFIELD COMPONENTS AT THE FREE SURFACE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention disclosure relates to the processing of marine seismic data, and in particular, to the mitigation of noise in the processing of pressure and particle motion signals recorded in a multi-component marine seismic survey.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Seismic exploration involves surveying subterranean geological formations for hydrocarbon deposits. A survey typically involves deploying acoustic source(s) and acoustic sensors at predetermined locations. The sources impart acoustic waves into the geological formations. The acoustic waves are sometime also referred to as "pressure waves" because of the way they propagate. Features of the geological formation reflect the pressure waves to the sensors. The sensors receive the reflected waves, which are detected, conditioned, and processed to generate seismic data. Analysis of the seismic data can then indicate the presence or absence of probable locations of hydrocarbon deposits.

Some surveys are known as "marine" surveys because they are conducted in marine environments. Note that marine surveys may be conducted not only in saltwater environments, but also in fresh and brackish waters. Marine surveys come in at least two types. In a first type, an array of streamers and sources is towed behind a survey vessel. In a second type, an array of seismic cables, each of which includes multiple sensors, is laid on the ocean floor, or seabed, and a source is towed from a survey vessel.

Historically, towed array, marine seismic surveys only employed pressure waves and the receivers detected any passing wavefront. This includes two types of wavefronts. The first are those reflected upward to the receivers from the geological formation. The second are those that are reflected from the surface of the water.

The art has recently begun moving to "multicomponent" surveys in which, for example, not only is the passing of a wavefront detected, but also the direction in which it is propagating. Knowledge of the direction of travel permits determination, for instance, of which wavefronts are traveling upward and will yield useful information and which are traveling downwards and will yield undesirable information if confused with upwards traveling waves. Multicomponent towed-array surveys include a plurality of receivers that detect not only the pressure wave, but also the velocity, or time derivatives (e.g., acceleration) thereof, of the passing wavefront. These receivers will hereafter be referred to as "particle motion sensors" because they measure the velocity or acceleration of displaced particles. The pressure sensor is typically a hydrophone, and the particle motion sensors are typically geophones or accelerometers.

More particularly, the water-air interface is a near perfect reflector of acoustic waves (in the art, the sea surface is known as a "free" surface): for every subterranean reflection, receivers in the array record a corresponding free surface reflection (known as the ghost), which, because of the limited towdepth, may destructively interfere with the upgoing waves at certain frequencies, creating notches in the spectrum where little or no energy is recorded. This reduces the bandwidth of the recorded data and complicates the waveforms.

It has long been known, and well established for seabed seismic surveying (i.e., by positioning an array or individual receivers on the seabed), that by recording the vertical component of particle motion in addition to the pressure, and by combining the pressure and particle motion data after suitable (spatial) filtering and scaling step, an output signal may be produced that is essentially "ghost" free, consisting of upgoing waves only. This procedure, since it may also produce an output consisting of downgoing free-surface reflected waves only, is known as wavefield decomposition.

Note that there are other methods commonly employed, besides wavefield decomposition, or PZ combination, to arrive at ghost free data. In particular, knowledge of the height of the sea surface may be used to estimate and remove the ghost. The present disclosure distinguishes between deghosting methods that only make use of knowledge about the sea-surface (so-called single-streamer deghosting) and methods that combine pressure and particle motion data (so-called wavefield decomposition or PZ-combination).

However, for marine seismic surveying, the construction of an antenna that accurately records the (vertical component of) particle motion accompanying the pressure, remains a challenge. Since it is difficult to decouple the particle motion measurement altogether from the cable, waves propagating along the cable (induced by small towing vibrations) are recorded and mask the underlying reflections from subterranean formations. This is especially a problem at the lower end of the seismic frequency band (i.e., below say 20-25 Hz), where the wavelength of the cable waves is close to the apparent wavelength of the subterranean reflections and the two cannot be separated using spatial filtering techniques.

Methods have been proposed which aim to circumvent this problem by calculating a "pseudo" particle motion signal involving the steps of single-streamer deghosting the relatively cable noise-free pressure data at low frequencies, reapplying a particle motion ghost and combining or "blending" the "pseudo" particle motion data with the actual recorded particle motion data such that the influence of the cable noise is minimized.

However, since such methods do not estimate the cable noise itself they implicitly disregard the good signal underlying the cable noise and effectively rely on hydrophone data only at low frequencies.

The present invention is directed to overcoming, or at least reducing the effects of, one or more of the problems set forth above.

BRIEF SUMMARY OF THE INVENTION

In its various aspects and embodiments, the present invention provides a method and apparatus implementing a technique for mitigating noise in seismic data. The method is software-implemented method and comprises: estimating a noise component in a set of multicomponent seismic data representing a recorded wavefield from the relationship at the free surface of an upgoing component and a downgoing component decomposed from the recorded wavefield; and removing the estimated noise component from the seismic data. The noise component can be estimated by decomposing a recorded wavefield into an upgoing component and a downgoing component and isolating a noise component in the recorded wavefield from the relationship of the decomposed upgoing and downgoing components at the free surface.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE SEVERAL VIEWS OF THE DRAWINGS

The invention will hereafter be described with reference to the accompanying drawings, wherein like reference numerals denote like elements, and:

FIG. 14A-FIG. 14C illustrate the efficacy of the technique when applied to a real data set.

Figure 1:
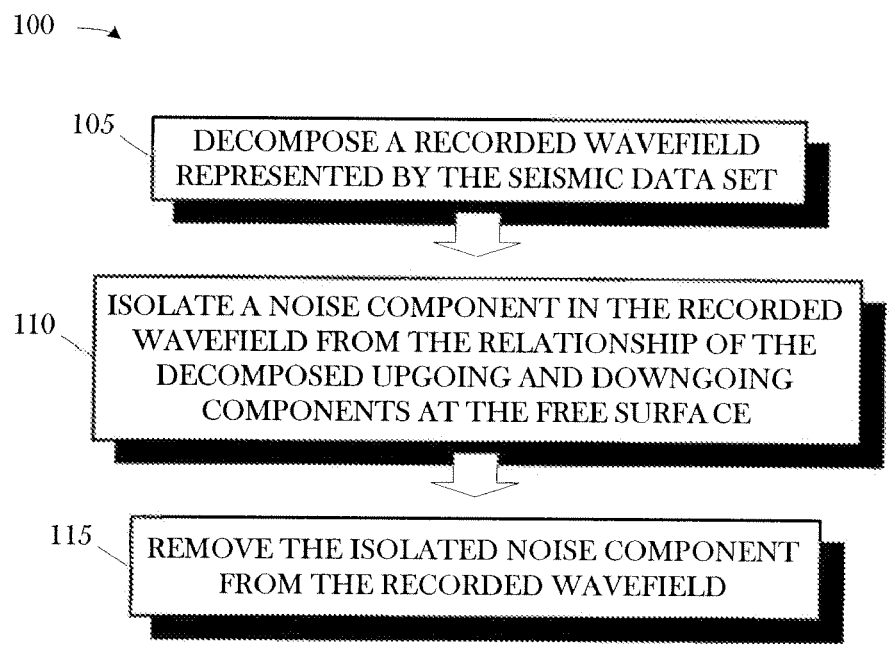
FIG. 1-FIG. 3 illustrate a method and an apparatus of one particular embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present invention includes a method and apparatus for acquiring and/or processing seismic data to yield an improved data set which, in turn, will yield better results in a seismic data analysis. The technique estimates vibration noise (or any other type of noise that does not obey the acoustic equation of motion) on particle motion sensors in multi-component marine seismic streamers. Noise is assumed to be pre-dominantly recorded on one of the components (typically the vertical). If noise is recorded on both components the current invention will still work, provided the noise between the two components is correlated and the correlation coefficient is known. The technique combines a free surface reflection operator (or, more generally, a redatuming operator) with acoustic wavefield decomposition to isolate a term involving only the noise. This term is then directly solved for the noise. The technique requires knowledge about the height of the free surface above the receivers.

In general, the noise of interest is vibration noise. This arises, in part, because the embodiments illustrated below involve information acquired in a towed-array survey. In these types of surveys, vibration of the streamer is a significant consideration. However, the present invention implicitly assumes that the "noise" on which it operates does not obey the acoustic equation of motion and therefore is not limited to vibration noise. "Noise" is considered to be any information that does not obey the acoustic equation of motion. Any waterborne noise type that does obey the acoustic equation of motion (e.g., guided waves in the water layer, or vessel engine noise), is considered signal in this approach and will not be removed. However, such noise types are not considered significant and may be removed by other methods.

More particularly, the instant invention presents a technique for mitigating noise in multicomponent seismic data acquired in a marine survey. The technique includes, in various aspects and embodiments, a computer-implemented method, various apparatuses for use in implementing the method, and a seismic data set in which noise has been mitigated through performance of the method.

The method realizes and exploits the relationship between the upgoing and downgoing components of a recorded wavefield at the free surface. At the free surface, the upgoing and downgoing components are negative mirror images of each other—i.e., they are the same but for the direction of travel and the sign. Thus, the total pressure is zero at the free surface. This is not true of the noise in the wavefield, or any other component of the recorded wavefield that does not obey the acoustic wave motion equations. Thus, at the free surface, the residual after summation of the upgoing and downgoing components is "noise". The noise component can be isolated by actually summing the upgoing and downgoing components. The isolated noise component can then be removed from the recorded wavefield.

However, as those in the art having the benefit of this disclosure will appreciate, seismic data is not typically collected at the free surface. Seismic data is typically collected at, for example, 6 m-10 m below the free surface. The present invention therefore manipulates the seismic data so that at least one of the upgoing and downgoing components appears as though it were collected at the free surface. Techniques known as "redatuming" by which the seismic data can be adjusted for its recording depth are known to the art. Such techniques can be applied to the recorded wavefield to "redatum" one or both of the upgoing and downgoing components to the free surface. Depending on the embodiment, a redatuming operator, or reflection factor, may also be applied.

Figure 3:
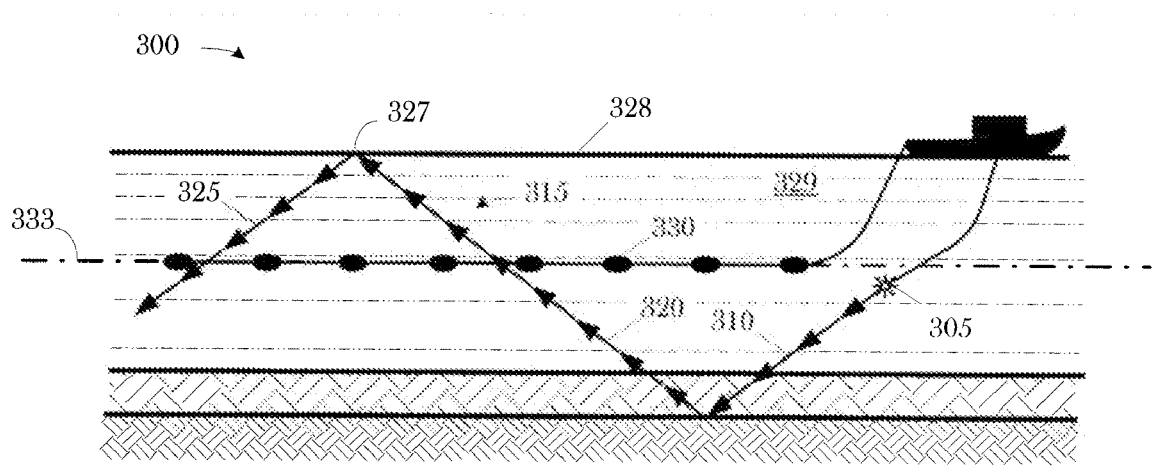
Figure 2:
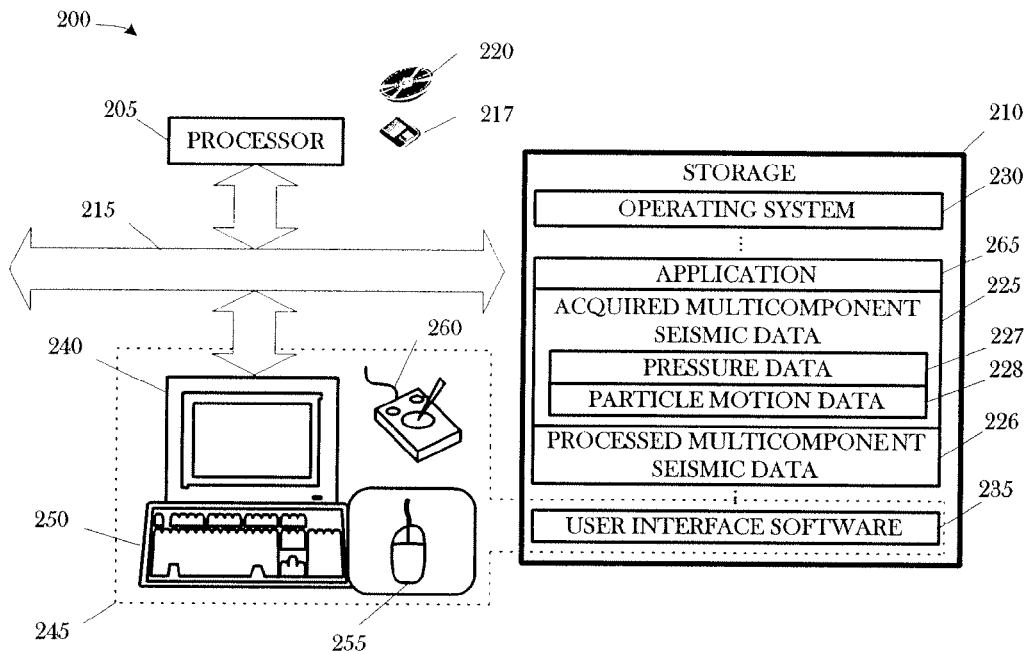

Referring now to the drawings wherein like reference numbers correspond to similar components throughout the several views and, specifically, referring to FIG. 1-FIG. 3, one particular embodiment of the present invention is disclosed. FIG. 1 presents a computer-implemented method 100 that may be performed on an apparatus such as the computing apparatus 200 of FIG. 2 to process data acquired in a marine survey such as the survey 300 in FIG. 3.

Turning now to FIG. 2, it shows selected portions of the hardware and software architecture of a computing apparatus 200 such as may be employed in some aspects of the present invention. The computing apparatus 200 includes a processor 205 communicating with storage 210 over a bus system 215. The storage 210 may include practically any type of medium, including a hard disk and/or random access memory ("RAM") and/or removable storage such as a floppy magnetic disk 217 and an optical disk 220.

The storage 210 is encoded with the acquired multicomponent seismic data 225. The acquired multicomponent seismic data 225 may have been previously acquired in any suitable manner known to the art. In general, the acquired multicomponent seismic data 225 is acquired in a marine survey 300, shown in FIG. 3, in which a source 305 imparts an acoustic seismic signal 310 into the environment and whose reflections result in a wavefield 315 comprised of an upgoing component 320 and a downgoing component 325. The upgoing and downgoing components 320, 325 are separated by a reflection 327 at the free surface 328 of the water 329.

As those in the art will appreciate, this process is iterated periodically over time. Also, the acoustic seismic signal 305 may be reflected many times. Thus, at any given time, the wavefield 315 may comprise several upgoing and downgoing components 320, 325 resulting from multiple seismic signals 310. The wavefield 315 is sensed by a plurality of sensors 330, only one indicated, which then outputs data representative of the wavefield 315. This data is then stored as the acquired multicomponent seismic data 225 to record the wavefield 315. The acquired multicomponent seismic data 225 includes, as is shown in FIG. 2, both pressure data 227 (i.e., "P data") and particle motion data 228 (e.g., "Z data").

Note that the acquired multicomponent seismic data 225 is digital at the time it is stored on the storage 210. In the particular embodiment disclosed below, the acquired multicomponent seismic data 225 is digital at the point of acquisition. However, the point of digitization may vary depending on the implementation. The data may therefore be digital upon output from the sensors (not shown) by which it is acquired or upon conversion after output and prior to storage.

The acquired multicomponent seismic data 225 may be stored using any suitable data structure known to the art. The data structure will typically be, for example, a flat file or a text delimited file. However, acceptable alternatives include structures such as a database, a list, a tree, a table, etc. The invention is not limited by the manner in which the acquired multicomponent seismic data 225 is stored.

The storage 210 is also encoded with an operating system 230, user interface software 235, and an application 265. The user interface software 235, in conjunction with a display 230, implements a user interface 245. The user interface 245 may include peripheral I/O devices such as a keypad or keyboard 250, a mouse 255, or a joystick 260. The processor 205 runs under the control of the operating system 230, which may be practically any operating system known to the art. The application 265, when invoked, performs the method of the present invention, e.g., the method 100 of FIG. 1. The user may invoke the application in conventional fashion through the user interface 245.

Returning to FIG. 1, the method 100 is a computer-implemented method for processing a marine multicomponent seismic data set representing a recorded wavefield. In the illustrated embodiment, the method 100 is performed by the execution of the application 265 by the processor 205 under the control of the OS 230, all shown in FIG. 2 and discussed above. Note, however, that the invention is not limited by the nature of the software component by which the method is implemented. In alternative embodiments, for example, the method 100 may be implemented in, e.g., a utility or some other kind of software component.

The method 100 is, in general terms, a software-implemented method for mitigating noise in multicomponent, marine seismic data. The method 100 estimates a noise component in a set of multicomponent seismic data representing a recorded wavefield from the relationship at the free surface of an upgoing component and a downgoing component decomposed from the recorded wavefield. It then removes the estimated noise component from the seismic data.

The method 100 assumes that the seismic data 225 has previously been calibrated. If this is not true, the seismic data 225 should first be calibrated. Calibration techniques are well known to the art. Any suitable calibration technique may be used.

Thus, more particularly, the method 100 decomposes (at 105) a wavefield 315 recorded in the seismic data 325 into an upgoing component 320 and a downgoing component 325. Many techniques for wavefield decomposition are known. Exemplary techniques include, but are not limited to, polarization based methods and spatial filtering plus summation methods (both frequency-wavenumber domain and spatially compact frequency-space domain approaches). One polarization technique is disclosed in Richwalski, S., Roy-Chowdhury, K., Mondt, J. C., 2000, "Practical Aspects of Wavefield Separation of Two-Component Surface Seismic Data Based on Polarization and Slowness Estimates," Geoph. Prosp., 48(4), 697-722. A suitable spatial filtering technique is disclosed in D J van Manen, D. J., Strommen-Melbo, A., Robertsson, J. O. A., Rosten, T., Amundsen, L., 2004, "Decomposition and Calibration of Multi-Component Data in the Common Shot Domain," Proceedings of the 66th European Association of Exploration Geophysicists Conference, Extended Abstract, Paper No. D026. These documents are hereby incorporated by reference for all purposes as if expressly set forth verbatim herein. However, any suitable technique known to the art may be used.

The method 100 then isolates (at 110) a noise component in the recorded wavefield 315 from the relationship of the decomposed upgoing and downgoing components 320, 235 at the free surface 328. The invention admits variation in the noise isolation as will be discussed further below. The aforementioned "redatuming" techniques and, in some embodiments, the application of a reflection operator, are employed to accomplish this.

The method 100 then removes (at 115) the isolated noise component from the recorded wavefield 315. Removal typically is performed by a subtraction of the estimated noise from the acquired seismic data. The difference between the acquired seismic data and the estimated noise is the "true" seismic data. The resulting processed seismic data 226, i.e., the "true" seismic data, can then be subjected to seismic analysis in accordance with conventional practice.

As mentioned above, the invention admits variation in the isolation of the noise component. For example, in the embodiment 400 shown in FIG. 4A, this can be done by processing (at 405) at least one of the decomposed upgoing and downgoing components 320, 325 such that the upgoing and downgoing components 320, 325 are at a common depth and propagating in the same direction. The difference between the processed upgoing and downgoing components 320, 325 can then be taken (at 410) to find the noise component. Or, as in the embodiment 450 shown in FIG. 4B, the decomposed upgoing and downgoing components 320, 325 can be redatumed (at 455) to the free surface 328. The redatumed upgoing and downgoing components 320, 325 can then be added (at 460) to find the noise component. In either scenarios, the noise can then be solved for (at 415, 465) once it is obtained.

Figures 4A, 4B:
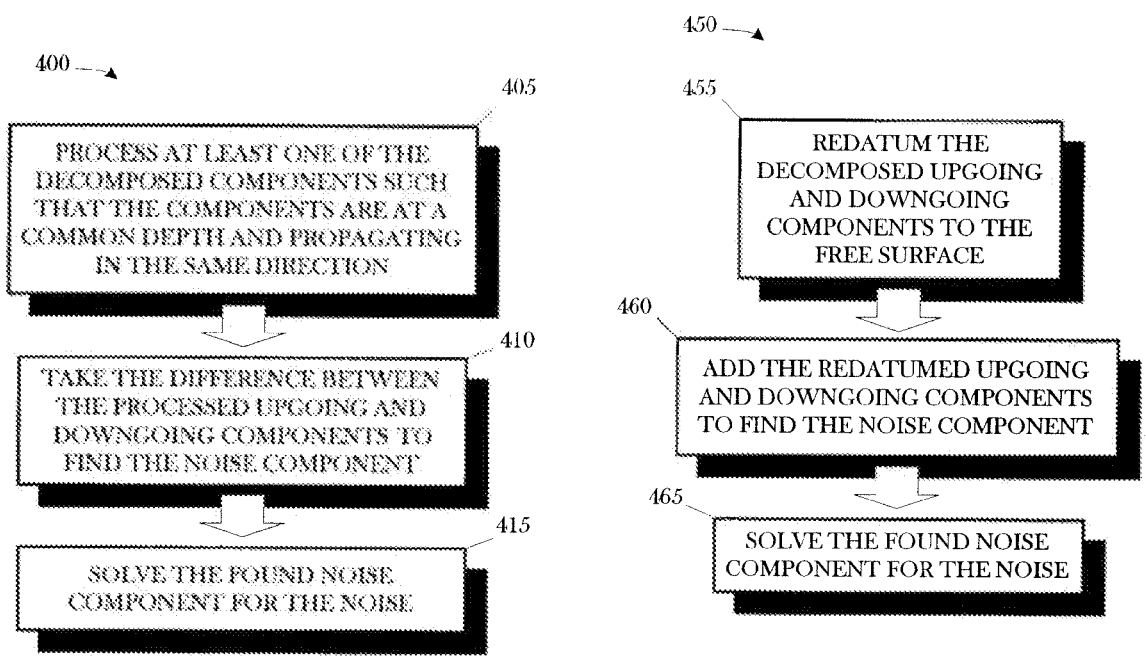
FIG. 4A-FIG. 4B illustrate two alternative implementations of the method of FIG. 1.
Figure 5A:
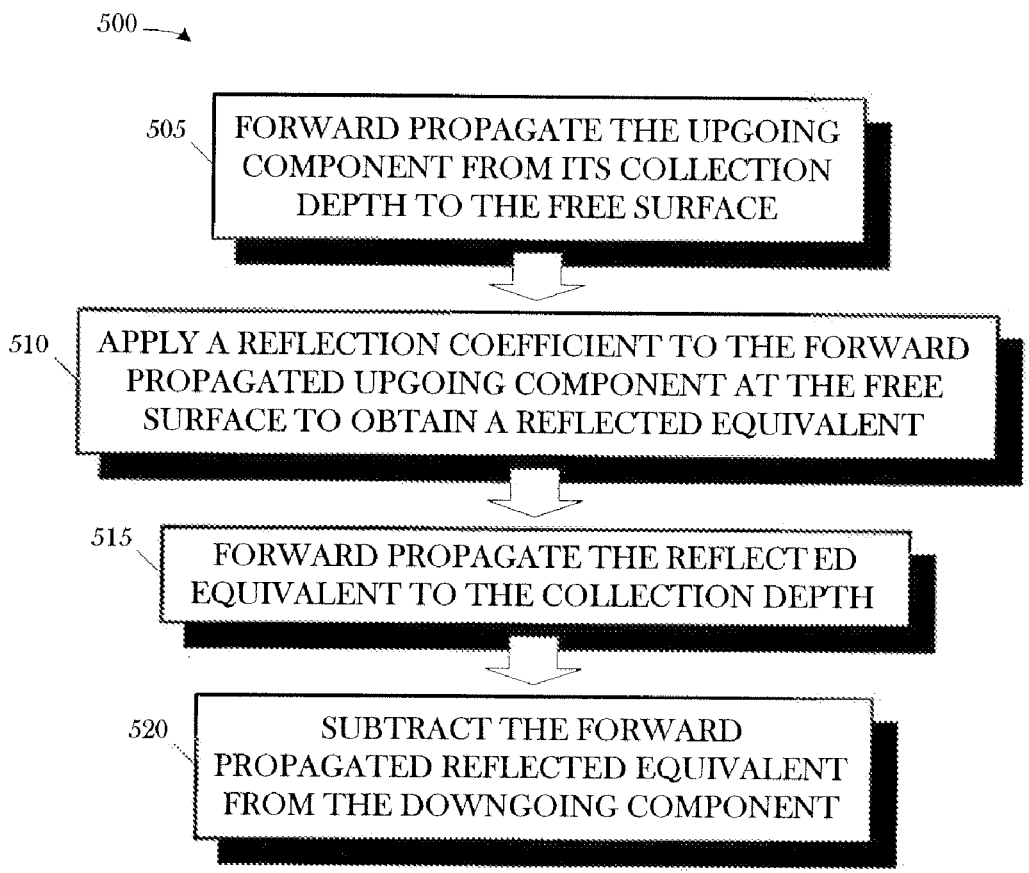
FIG. 5A-FIG. 5B and FIG. 6A-FIG. 6B illustrate two alternative implementations of the embodiment of FIG. 4A.

More particularly, consider the implementation 500, shown in FIG. 5A of the embodiment 400 in FIG. 4A. As discussed above, the wavefield 315 comprising the upgoing component 320 and the downgoing component 325 is recorded by the receivers 330 at the collection depth 333. Once the upgoing and downgoing components 320, 325 are decomposed, the upgoing component 320 is forward propagated (at 505), as conceptually represented in FIG. 5B at 507, to the free surface 328. The forward propagation (at 505) is performed using the redatuming techniques well known in the art for use in other contexts.

The forward propagated upgoing component 320 is then reflected at the free surface 328. In the illustrated embodiment, the reflection is performed by applying (at 510) a reflection coefficient to the forward propagated upgoing component 320 at the free surface 328 to obtain a reflected equivalent. The reflected equivalent is then forward propagated (at 515) to the collection depth, as conceptually illustrated at 517.

At this point, the upgoing component 320 has been processed to appear as though it were collected at the same point as the downgoing component. The only difference between the processed upgoing component 320 and the downgoing component 325 will be those portions of the recorded wavefield 315 that do not obey the acoustic equation of motion—i.e., "noise". Thus, the difference between the processed upgoing component 325 and the downgoing component 325 will be the noise isolated from the signal. Accordingly, in this particular embodiment, the forward propagated reflected equivalent (or, the processed upgoing component 320) is subtracted (at 520) from the downgoing component.

Figure 5B:
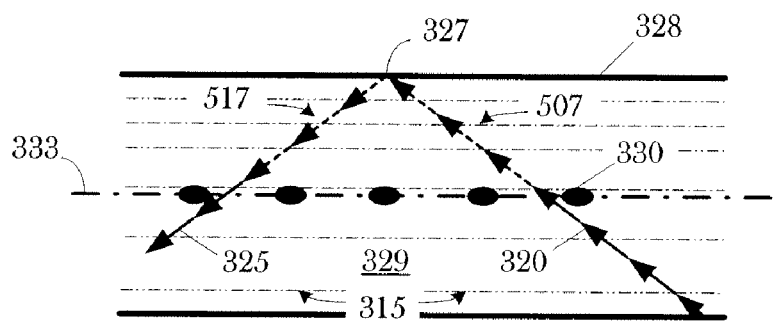
Figure 6A:
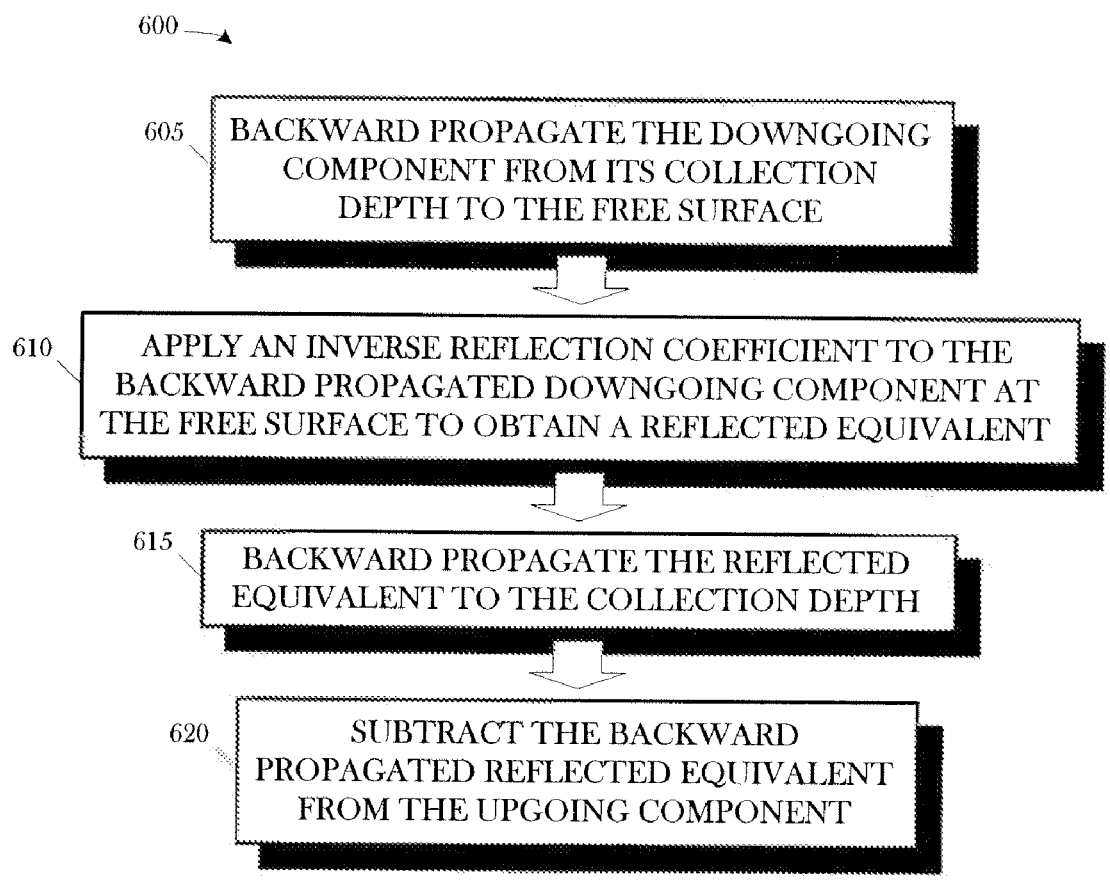
Figure 6B:
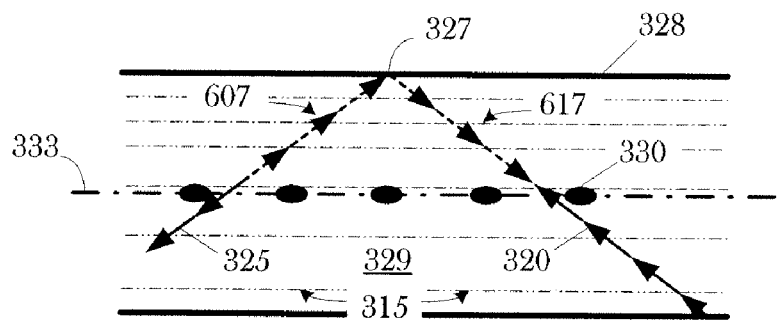

Those in the art having the benefit of this disclosure will appreciate that the embodiment 400 shown in FIG. 4A may be implemented in alternative ways. For instance, the embodiment 400 may be implemented "inversely" to that which is shown in FIG. 5A-FIG. 5B. One such "inverse" implementation 600 is illustrated in FIG. 6A-FIG. 6B. The implementation 600 begins by backward propagating (at 605) the downgoing component 325 from its collection depth 333 to the free surface 328, as conceptually represented at 607. Because this particular implementation 600 is backpropagating, it applies (at 610) an inverse reflection coefficient to the backward propagated downgoing component 325 at the free surface 328 to obtain a reflected equivalent. The reflected equivalent is then backward propagated (at 615) to the collection depth 333, as conceptually represented at 617. The noise component is the isolated by subtracting (at 620) the backward propagated reflected equivalent (or processed downgoing component 325) from the upgoing component 320.

Another alternative implementation involves redatuming the reflected equivalent. In each of the implementations presented in FIG. 5A-FIG. 5B and FIG. 6A-FIG. 6B, the reflected equivalent is redatumed to the collection depth 333. That is, in the implementation of FIG. 4A-FIG. 4B, the reflected equivalent is forward propagated to the collection depth 333 while in the implementation of FIG. 5A-FIG. 5B the reflected equivalent is backpropagated. Redatuming to the collection depth 333 is a convenience since the component that is not redatumed to the free surface 328 is already at that depth. This reduces the overall amount of processing for the seismic data.

However, the invention is not so limited. There may be circumstance where collection occurs at a depth undesirable for the subsequent processing following application of the present invention. Thus, the reflected equivalent can be redatumed to some other depth other than the collection depth. If so, then the unreflected component will need to be redatumed to this other depth, as well. Note that this "other depth" may be deeper or shallower than the collection depth depending on circumstance. Accordingly, the unreflected component may be forward propagated or backpropagated depending on whether it is an upgoing or a downgoing component and depending on "other depth" relative to the collection depth. Thus, in accordance with the present invention, the reflected equivalent is redatumed to a predetermined depth that may or may not be the collection depth. This predetermined depth may be considered a "common" depth since it is "common" to both components at the time the noise component is isolated.

Figure 7A:
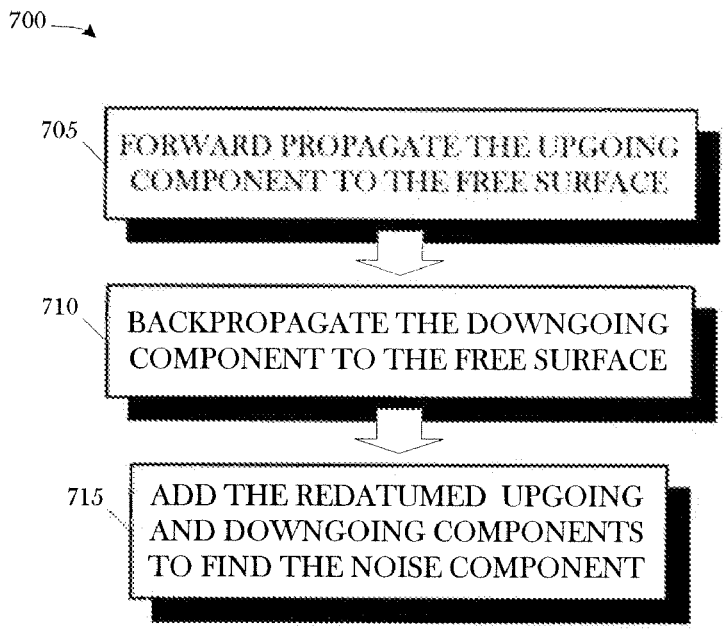
FIG. 7A-FIG. 7B illustrate one particular embodiment of FIG. 4B.
Figure 7B:
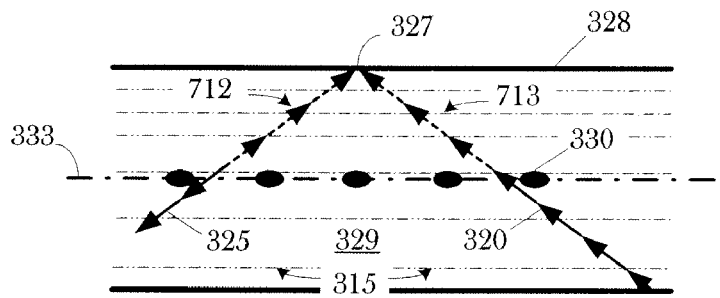

As another example of variation in noise isolation, consider the embodiment 450 of FIG. 4B in the implementation 700 of FIG. 7A-FIG. 7B. In this particular embodiment, both the upgoing and downgoing components 320, 325 (shown in FIG. 3) are redatumed to the free surface 328. That is, as is shown in FIG. 7A, the upgoing component 320 is forward propagated (at 705) to the free surface 328 and the downgoing component 325 is backpropagated (at 710) to the free surface 328. This is conceptually illustrated in FIG. 7B at 712, 713, respectively. Note that components 320, 325 are then both at the free surface 328 and that neither one is reflected. The signal components of the recorded wavefield 315 (as opposed to the noise components) are therefore equal in magnitude and opposite in sign. Adding (at 715) the upgoing and downgoing components 320, 325 will therefore isolate the noise components.

Now, to further an understanding of the present invention, a more technical discussion of the principles underlying the technique described above will now be presented. The technical discussion pertains to the embodiment illustrated in FIG. 5A-FIG. 5B. In the following discussion, the basic equations for the data, wavefield decomposition (PZ-combination) and free surface reflection are presented. This is followed by a discussion on the reflection of a plane, vertically incident pressure wave ("P-wave") from below. The illustrated embodiment assumes that the particle motion data has already been scaled with the impedance of the water and has been integrated or differentiated to a particle velocity equivalent (if accelerometers or particle displacements were used, respectively). Consequently, it can be compared to the pressure directly.

The basic data equations for the pressure (P) and vertical displacement (Z) are given by:

$$P = P^{up} + P^{down}, \text{ and} \quad (1a)$$

$$Z = P^{up} - P^{down} + N \quad (1b)$$

wherein:
P≡the sensed composite pressure wavefield;
$P^{up}$≡the sensed upgoing component of the composite wavefield;
$P^{down}$≡the sensed downgoing component of the composite wavefield;
Z≡the sensed vertical velocity; and
N≡the noise component of the sensed vertical velocity.

Wavefield decomposition, sometimes also called PZ-combination, of the acquired seismic data recorded above gives:

$$\tilde{P}^{down} = \frac{1}{2}(P - Z) = P^{down} - \frac{1}{2}N, \text{ and} \quad (2a)$$

$$\tilde{P}^{up} = \frac{1}{2}(P + Z) = P^{up} + \frac{1}{2}N \quad (2b)$$

wherein:
$\tilde{P}^{down}$≡the estimated downgoing component of the composite wavefield;
$\tilde{P}^{up}$≡the estimated upgoing component of the composite wavefield; and
P, $P^{up}$, $P^{down}$, Z, and N are as defined above.

As noted above, there are many techniques well known to the art for performing this decomposition and any suitable one may be used.

It can be seen from Eq. (2a) and Eq. (2b) that the estimated upgoing component $\tilde{P}^{up}$ and estimated downgoing component $\tilde{P}^{down}$ consist of the sensed upgoing pressure $P^{up}$ and the sensed downgoing pressure $P^{down}$ respectively, plus scaled pure noise N terms. Note that the noise on the particle motion sensor "leaks" into the estimates of upgoing and downgoing components with equal but opposite sign.

Next, knowledge about the sea surface is introduced in the form of a reflection operator. For simplicity, we discuss the case of flat sea surface. However, it should be noted that more accurate reflection operators may be derived for rough sea-surfaces provided the height of the sea surface above each receiver is available. For example, one such technique is a Kirchhoff scattering formulation such as is well known in the art. The height of the sea surface can be estimated from the data directly. Again, a number of techniques for this purpose are well known in the art. One such technique is disclosed and claimed in co-pending and commonly assigned U.S. patent application Ser. No. 10/492,874, filed Sep. 18, 2002, in the name of the inventors Robert Laws, et al., and entitled "Determination of The Height of a Surface of a Fluid Column". This application is hereby incorporated by reference for all purposes as if expressly set forth verbatim.

Note, however, that calculating or modeling the free-surface reflections from estimated or measured wave-heights may not be the only way to obtain the free-surface reflection operator. One could think of measuring/observing the free-surface reflection operator through some other means. For instance, if an estimate of the free-surface reflection operator is available from some other source (e.g., direct measurement/observation) this can be used too. Any suitable technique known to the art may be used.

Applying knowledge of the free surface reflector to the sensed upgoing component $P^{up}$ and the estimated upgoing component $\tilde{P}^{up}$ yields:

$$P^{down} = -P^{up} \cdot e^{i\omega t_{refl}} \quad (3a)$$

$$\tilde{P}^{down} = -\tilde{P}^{up} \cdot e^{i\omega t_{refl}} \quad (3b)$$

wherein:
$\hat{P}^{down}$≡a second estimate of the downgoing component of the recorded wavefield;
$e^{i\omega t_{refl}}$≡the free surface reflection operator;
ω≡the frequency of the acoustic signal;
$t_{refl}$≡the vertical two-way traveltime of the wavefield through the water layer; and
$P^{down}$, $P^{up}$, and $\tilde{P}^{up}$ are as defined above.

Eq. (3a) and Eq. (3b) are formulated in the temporal frequency domain and express the fact that (1) the true downgoing pressure wavefield is minus (−) the true upgoing wavefield, time-delayed by the vertical two-way-traveltime $t_{refl}$ through the water layer [$e^{i\omega t_{refl}}$], and, similarly, that (2) a second estimate of the downgoing wavefield can be obtained by reflecting the estimate of the upgoing wavefield in the free surface in the same manner. Note that the free surface reflection operator combines the actions of: forward propagation, application of a reflection coefficient, and forward propagation to the collection depth into a single operator. This can be made more explicit through the following identity: $-e^{i\omega t_{refl}} = e^{0.5 i\omega t_{refl}} \cdot -1 \cdot e^{0.5 i\omega t_{refl}}$. By inserting Eq. (2b) for the estimated upgoing wavefield into Eq. (3b) and using the free surface reflection identity for the true up-going and downgoing wavefields, Eq. (3a), together with Eq. (2a), one arrives at a system of two equations and two unknowns, which can be solved for the cable noise component:

$$\tilde{P}^{down} - \hat{P}^{down} = \frac{1}{2}(1 - e^{i\omega t_{refl}})N \quad (4a)$$

$$N = \frac{2(\tilde{P}^{down} - \hat{P}^{down})}{1 - e^{i\omega t_{refl}}} \quad (4b)$$

wherein $\hat{P}^{down}$, $\tilde{P}^{down}$, ω, i, and $t_{refl}$ are as defined above.

Note that the Eq. (4b) above contains a division in the temporal frequency domain, which is zero for certain products of frequency and two-way-traveltime. One way of stabilizing the division is by using the so-called water level method as is known to the art. In this approach, both the numerator and the denominator are multiplied by the complex-conjugate of the denominator, and the notches of the resulting zero-phase term in the denominator (which corresponds to an auto-correlation in the time-domain) filled up to a certain fraction, c, of the maximum. Typically, c=0.001. This is the approach used in the example below. The estimate of the noise of the particle motion sensor can subsequently be subtracted from the particle motion data to produce a significantly lower-noise particle motion measurement. Note that there are other, similar, stabilization methods which could be used.

Note also that the noise estimate is obtained by a frequency-by-frequency solution. However, the method is not limited to a frequency-domain implementation. More specifically, frequency-domain division corresponds to deconvolution in the time-domain and other (stable) time-domain implementations of Eq. (4b) may also be implemented.

As mentioned above, the illustrated embodiment assumes that the particle motion data has already been scaled with the impedance of the water and has been integrated or differentiated to a particle velocity equivalent. This permits direct comparison to the pressure. However, the present invention is not limited to the case of vertically incident (or plane-waves) or to a particular type of particle motion sensor only. Those skilled in the art will be able to easily generalize the illustrated embodiment to realistic non-planar incident wavefields, in which case wavefield decomposition will involve spatial filtering of the particle motion data, given the present disclosure herein. For example, consider Eq. (5)-Eq. (7), which represent the generalized data and noise model:

$$P(k_x, \omega) = P^{up}(k_x, \omega) + P^{down}(k_x, \omega) \tag{5}$$

$$Z(k_x, \omega) = \frac{k_z}{\rho\omega}[P^{up}(k_x, \omega) - P^{down}(k_x, \omega)] + N(k_x, \omega) \tag{6}$$

$$k_z = \sqrt{\left(\frac{\omega}{c}\right)^2 - k_x^2} \tag{7}$$

Eq. (8) and Eq. (9) represent the generalized PZ combination:

$$\tilde{P}^{down}(k_x, \omega) = \frac{1}{2}\left(P(k_x, \omega) - \frac{\rho\omega}{k_z}Z(k_x, \omega)\right) \tag{8}$$

$$= P^{down}(k_x, \omega) - \frac{1}{2}\frac{\rho\omega}{k_z}N(k_x, \omega)$$

$$\tilde{P}^{up}(k_x, \omega) = \frac{1}{2}\left(P(k_x, \omega) + \frac{\rho\omega}{k_z}Z(k_x, \omega)\right) \tag{9}$$

$$= P^{up}(k_x, \omega) + \frac{1}{2}\frac{\rho\omega}{k_z}N(k_x, \omega)$$

Eq. (10) and Eq. (11) represent the generalized free surface reflection:

$$P^{down}(k_x, \omega) = -P^{up}(k_x, \omega) \cdot e^{2ik_z z} \tag{10}$$

$$\tilde{P}^{down}(k_x, \omega) = -\tilde{P}^{up}(k_x, \omega) \cdot e^{2ik_z z} \tag{11}$$

$$= P^{down}(k_x, \omega) - \frac{1}{2}\frac{\rho\omega}{k_z}N(k_x, \omega) \cdot e^{2ik_z z}$$

And Eq. (12) and Eq. (13) represent the generalized noise solution:

$$\tilde{P}^{down}(k_x, \omega) - \tilde{P}^{down}(k_x, \omega) = \frac{1}{2}\frac{\rho\omega}{k_z}(1 - e^{2ik_z z})N(k_x, \omega) \tag{12}$$

$$N(k_x, \omega) = \frac{2k_z}{\rho\omega}\frac{\left[\tilde{P}^{down}(k_x, \omega) - \tilde{P}^{down}(k_x, \omega)\right]}{(1 - e^{2ik_z z})} \tag{13}$$

The illustrated embodiment assumes that the source depth is greater than the receiver depth. Should the source be above the receiver depth, the direct downgoing wave should be removed before applying the above methodology. Otherwise, there is no corresponding upgoing event and the model does not hold. Techniques for removing the direct downgoing wave are well known to the art and any suitable techniques may be employed.

As was previously mentioned, the acquired multicomponent seismic data 225 should be calibrated before application of the method. However, it is also possible to filter the noise estimate with, e.g., a 20 Hz low-pass filter before subtracting the filtered noise estimate from the measured particle motion data. This approach could be followed when it is known that the cable noise is insignificant above a certain temporal frequency.

The method could be applied, equally well, by reconstructing an upgoing wave from its free surface reflection. This entails backpropagating a first estimate of the downgoing wavefield (obtained by PZ-combination) upwards to the sea-surface, reflecting it and backpropagating it downwards to the receiver level. This involves inverting Eq. (3a) and Eq. (3b) (i.e., solving for the upgoing wavefields rather than the downgoing wavefields). The new estimate of the upgoing wavefield could then be compared to the estimate of the upgoing wavefield obtained by PZ-combination and again the difference solved for the noise.

Accordingly, in one aspect, the present invention includes a computer-implemented method, such as the method 100 of FIG. 1. In another aspect, the invention includes a computing apparatus such as the computing apparatus 200 of FIG. 2, programmed to perform such a method. In still another aspect, the invention includes a program storage medium such as the optical disk 220, encoded with instructions that, when executed by a computing apparatus, performs a method such as the method 100.

Thus, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 8:
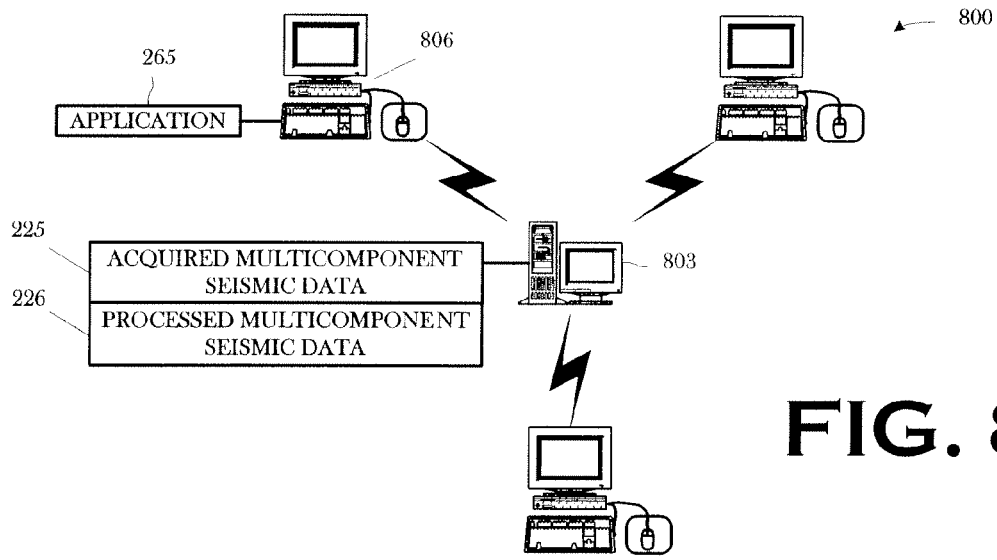
FIG. 8 depicts a distributed computing system on which some aspects of the present invention may be practiced in embodiments alternative to that shown in FIG. 2.

Note that there is no need for the multicomponent seismic data 225 to reside on the same computing apparatus 300 as the application 265 by which it is processed. Some embodiments of the present invention may therefore be implemented on a distributed computing apparatus. Consider, e.g., the computing system 800 in FIG. 8, comprising more than one computing apparatus. For example, the multicomponent seismic data 225 may reside in a data structure residing on a server 803 and the application 265 by which it is processed on a workstation 806 where the computing system 800 employs a networked client/server architecture. Furthermore, although the acquired multicomponent seismic data 225 is shown residing on the server 803 with the processed multicomponent seismic data 226, there is no requirement that they reside together.

However, there is no requirement that the computing system 800 be networked. Alternative embodiments may employ, for instance, a peer-to-peer architecture or some hybrid of a peer-to-peer and a client/server architecture. The size and geographic scope of the computing system 800 is not material to the practice of the invention. The size and scope may range anywhere from just a few machines of a Local Area Network ("LAN") located in the same room to many hundreds or thousands of machines globally distributed in an enterprise computing system.

Figure 9A:
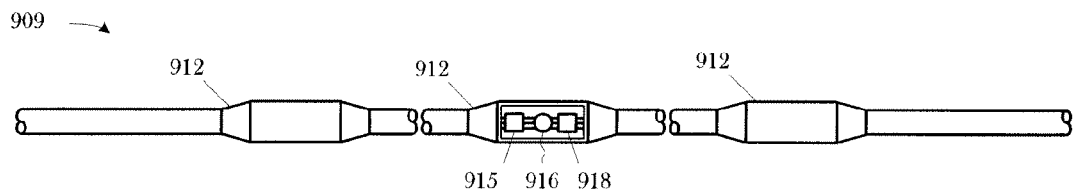
FIG. 9A-FIG. 9B depicts an alternative distributed computing apparatus on which some aspects of the present invention may be practiced in some embodiments.
Figure 9B:
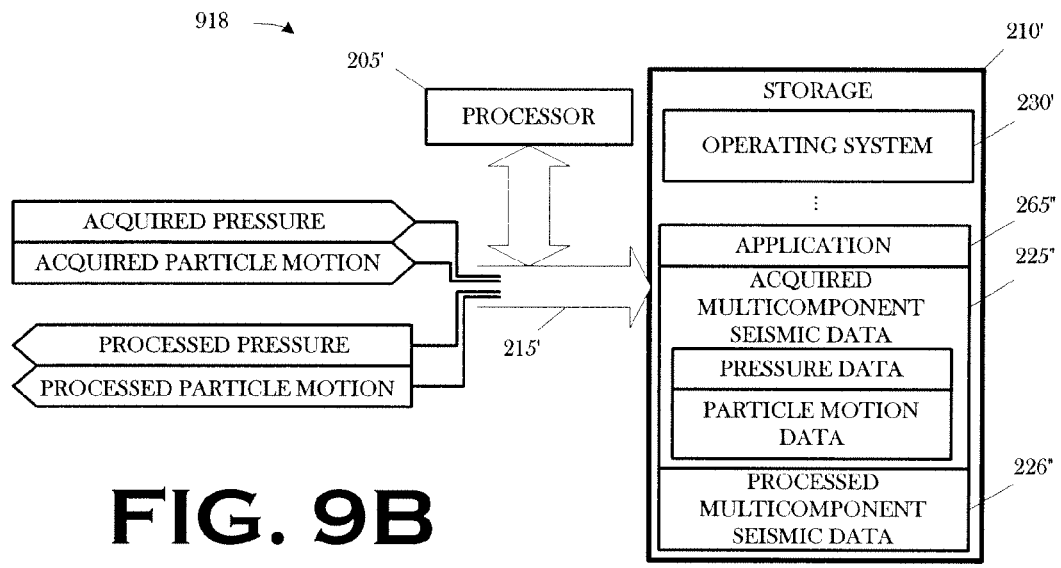

Such a distributed computing system may even be implemented in the streamer in some embodiments. For instance, consider the streamer 909 in FIG. 9A. The streamer 909 includes a plurality of instrumented sondes 912. Each instrumented sonde 912 includes sensors 915, 916 for acquiring the multicomponent seismic data 325. Each instrumented sonde 912 also includes a computing element 918, shown in greater detail in FIG. 9B. The application 365" is invoked by the OS 330' on power up, reset, or both. As the multicomponent seismic data 325" and sensor orientation data 326" are acquired, the application 365" pre-processes it in accordance with the present invention. Thus, the computing is distributed along the streamer 909 rather than being centralized in FIG. 9A or distributed across a land-based computing system as in FIG. 9A.

Figure 10A:
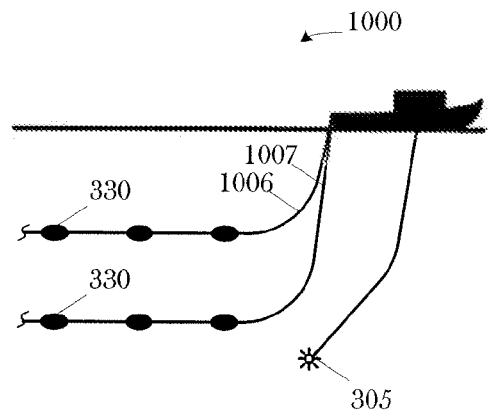
FIG. 10A and FIG. 10B depict two alternative over/under acquisition techniques for acquiring data with which the present invention may be employed.
Figure 10B:
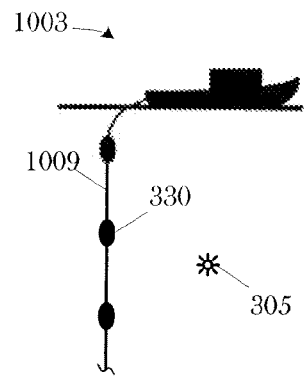

The present invention is also potentially useful for over/under acquisition. FIG. 10A and FIG. 10B illustrate two alternative over/under acquisition techniques 1000, 1003. FIG. 10A depicts a portions of a pair of vertically displaced streamers 1006, 1007, one towed above the other. Note that variations on this embodiment may employ more than two vertically displaced streamers and may also include horizontally displaced streamers, as well. Each of the streamers 1006, 1007 comprises a plurality of instrumented sondes 330 as described above that, by virtue of the physical relationship of the streamers 1006, 1007, are also vertically displaced. FIG. 10B depicts a portion of a vertical streamer 1009, comprising a plurality of vertically displaced instrumented sondes 330. Other over/under acquisition scenarios may become apparent to those skilled in the art having the benefit of this disclosure.

In such over/under acquisitions, the vertical component (proportional to the pressure gradient) is estimated from two (or more) vertically separated streamers, or single-streamers with vertically displaced hydrophones. Such finite-difference approximations to the pressure gradient are known to be susceptible to (random) noise, i.e., noise that does not obey the acoustic equation of motion. If the resulting noise on the estimated vertical component does not obey the equation of motion and is much stronger than the individual noises present on the pressure sensors, the method of the present invention applies.

Figure 11:
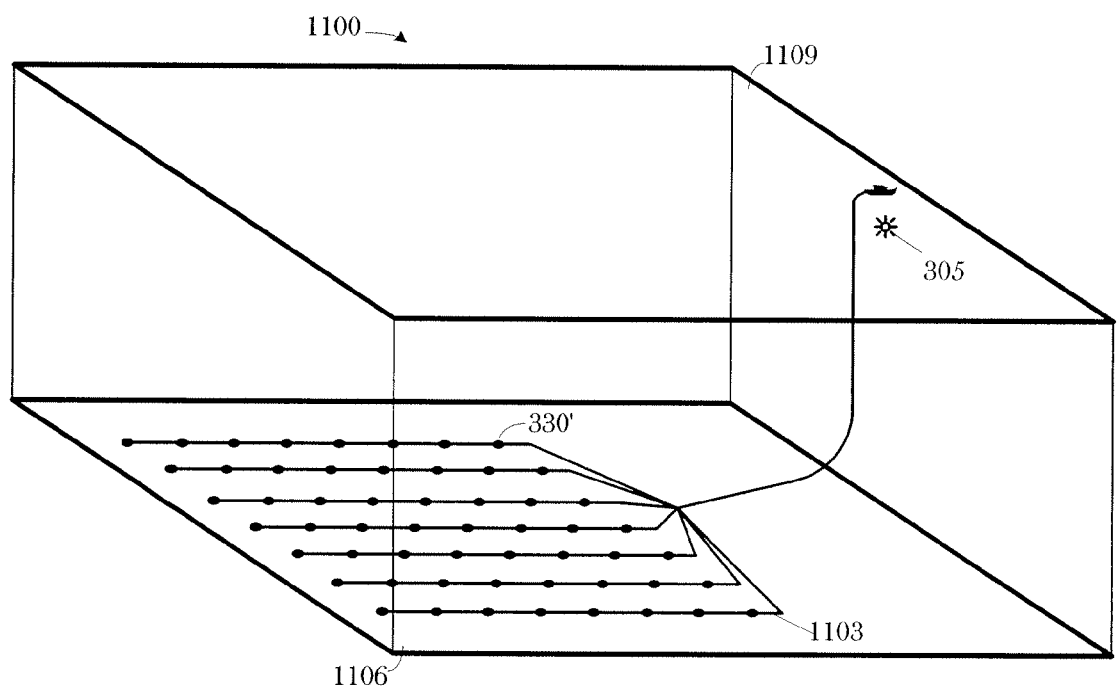
FIG. 11 depicts a seabed survey for acquiring data with which the present invention may be employed in some embodiments.

The method of the present invention can also be applied to multi-component seabed seismic data, as well. FIG. 11 depicts a seabed survey 1100 in a stylized fashion. A plurality of ocean bottom cables 1103 (only one indicated) each comprising a plurality of instrumented sondes 330' (only one indicated), are positioned on the seabed 1106. The sondes 330' collect data from reflections generated as previously described and transmits it to the surface 1109. The data collection, however, is subject to commonly observed "shear (noise) on vertical".

This noise is low-velocity noise looking like shear-waves but recorded on the vertical component of particle motion and masking the compressional-waves. This type of noise is largely absent on the pressure recording and since the acoustic equation of motion is valid for pressure and vertical component data recorded at the seabed, and a free surface is present, the method of the present invention applies.

Figure 12A:
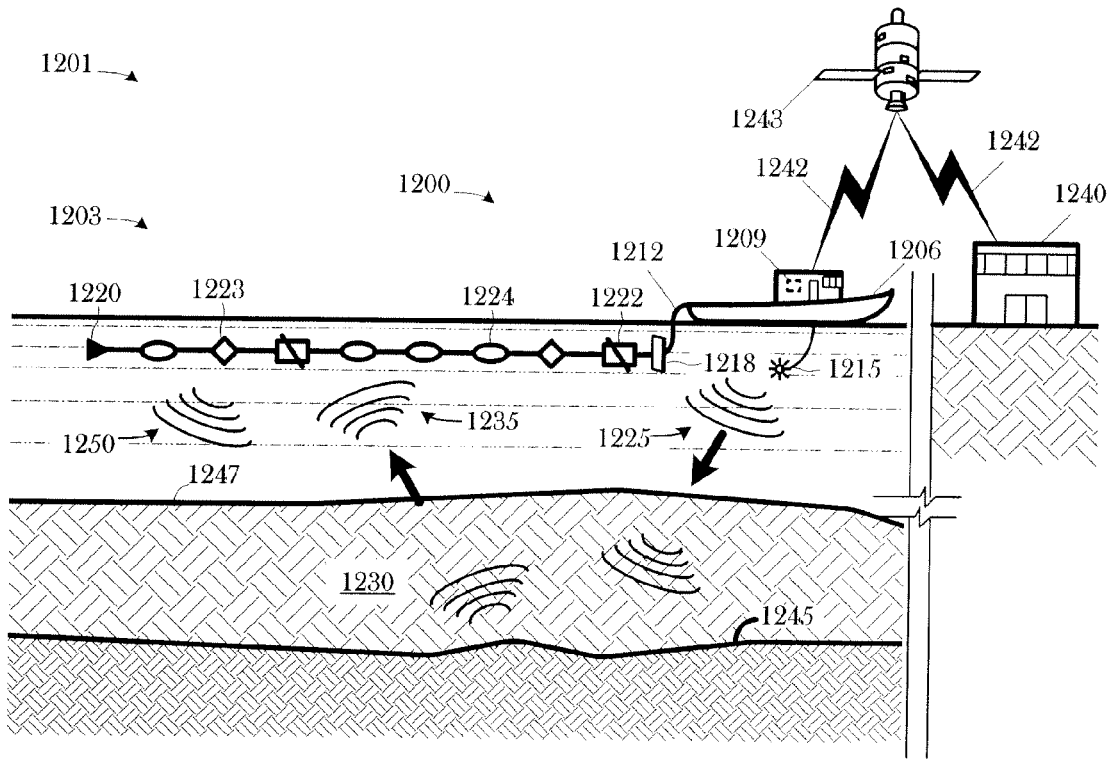
FIG. 12A-FIG. 12B depict a towed array, marine seismic survey practiced in accordance with one aspect of the present invention.
Figure 12B:
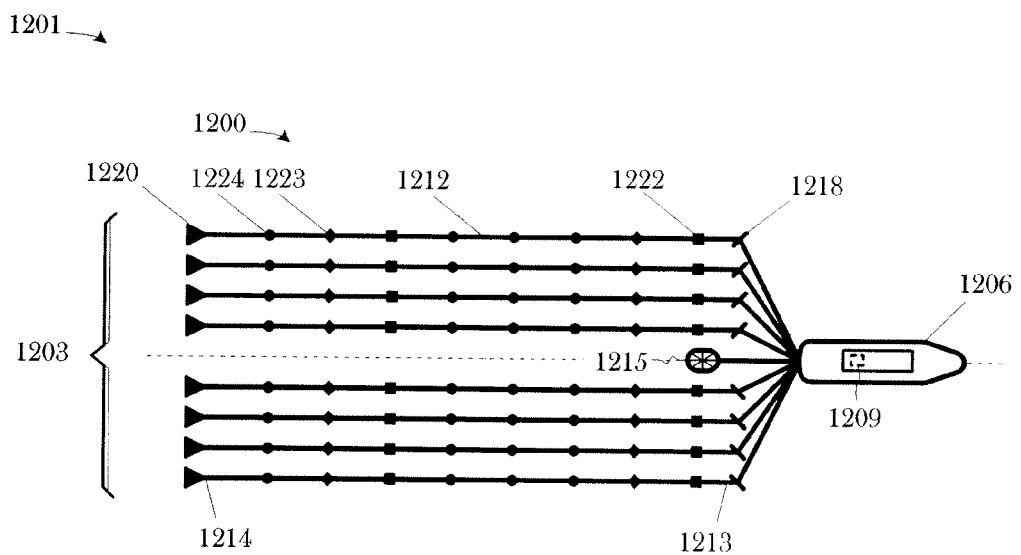

As those in the art having the benefit of this disclosure will appreciate, the acquisition of the multicomponent seismic data 265 is more complex than is presented above. To further an understanding of the present invention, additional information regarding the data acquisition will now be presented. FIG. 12A and FIG. 12B illustrate a towed array survey system 1200 in a towed array marine survey 1201.

Recall that the acquired multicomponent seismic data 225 comprises pressure data 227 and particle motion data 228. As a preliminary matter, note that, in this particular embodiment, the particle motion data 228 that is acquired is velocity data, or the particle displacement of the passing wavefront. This is but one type of the particle motion data 228 suitable for use in the present invention. Alternative embodiments may, for instance, acquire the acceleration of the passing wavefront, i.e., the second derivative in time of the particle displacement. Other quantities may be also be suitable for use in the present invention, as well. Note further that some embodiments may acquire one type of the particle motion data 228 and convert it in processing to use another. Thus, some embodiments might acquire the velocity data, process it to take the time derivative, and then use the acceleration data in the rest of the method of the invention. Or, some embodiment might acquire the acceleration, integrate it over time to get the velocity, and then use the velocity data in the rest of the method.

Referring now to FIG. 12A and FIG. 12B, in this particular embodiment, the survey system 1200 generally includes a spread array 1203 towed by a survey vessel 1206 on board of which is a computing apparatus 1209. The towed array 1203 comprises eight marine, towed seismic cables, or streamers, 1212 (only one indicated) that may, for instance, each be 8 km long. Note that the number of streamers 1212 in the towed array 1203 is not material to the practice of the invention. Thus, alternative embodiments may employ different numbers of streamers 1212. In some embodiments, the outermost streamers 1212 in the array 1203 could be, for example, 900 meters apart.

A seismic source 1215 is also shown being towed by the survey vessel 1206. Note that, in alternative embodiments, the seismic source 1215 may not be towed by the survey vessel 1206. Instead, the seismic source 1215 may be towed by a second vessel (not shown), suspended from a buoy (also not shown), or deployed in some other fashion known to the art. The known seismic sources include impulse sources, such as explosives and air guns, and vibratory sources which emit waves with a more controllable amplitude and frequency spectrum. The seismic source 1215 may be implemented using any such source known to the art. In the illustrated embodiment, the seismic source 1215 comprises an air gun or an array of air guns At the front of each streamer 1212 is a deflector 1218 (only one indicated) and at the rear of every streamer 1212 is a tail buoy 1220 (only one indicated). The deflector 1218 laterally, or in the crossline direction, positions the front end 1213 of the streamer 1212 nearest the survey vessel 1206. The tail buoy 1220 creates drag at the tail end 1214 of the streamer 1212 farthest from the survey vessel 1206. The tension created on the streamer 1212 by the deflector 1218 and the tail buoy 1220 results in the roughly linear shape of the streamer 1212 shown in FIG. 12A.

Located between the deflector 1218 and the tail buoy 1220 are a plurality of seismic cable positioning devices known as "birds" 1222. The birds 1222 may be located at regular intervals along the seismic cable, such as every 200 to 400 meters. In this particular embodiment, the birds 1222 are used to control the depth at which the streamers 1212 are towed, typically a few meters. In one particular embodiment, the steerable birds 1218 are implemented with Q-fin™ steerable birds as are employed by WesternGeco, the assignee hereof, in their seismic surveys.

The principles of design, operation, and use of such steerable birds are found in PCT International Application WO 00/20895, entitled "Control System for Positioning of Marine Seismic Streamers", filed under the Patent Cooperation Treaty on Sep. 28, 1999, in the name of Services Petroliers Schlumberger as assignee of the inventors Øyvind Hillesund et al. However, any type of steerable device may be employed. For instance, a second embodiment is disclosed in PCT International Application No. WO 98/28636, entitled "Control Devices for Controlling the Position of a Marine Seismic Streamer", filed Dec. 19, 1997, in the name of Geco AS as assignee of the inventor Simon Bittleston. In some embodiments, the birds 1218 may even be omitted.

The streamers 1212 also include a plurality of instrumented sondes 1224 (only one indicated) distributed along their length. The instrumented sondes 1224 may be of any suitable construction known to the art and house the sensors (discussed more fully below) used to acquire the data. The sondes 1224 are distributed in a manner that permits them to densely sample in the inline direction, e.g., 0.5 m-10 m apart. The sondes 1224 may be regularly or irregularly distributed. In the illustrated embodiment, the sondes 1224 are regularly distributed and are spaced 3.125 meters apart and studies indicate that separations smaller than 0.5 m may be suitable.

Figure 13:
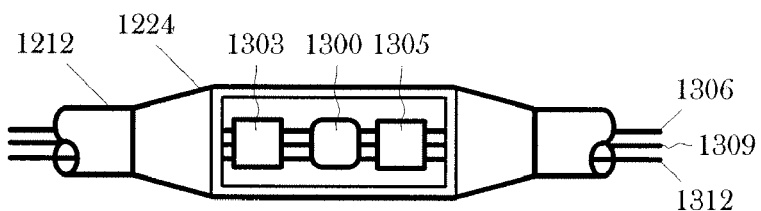
FIG. 13 conceptually depicts one particular sensor arrangement for the seismic survey of FIG. 12A and FIG. 12B.

The instrumented sondes 1224 house, in the illustrated embodiment, an acoustic sensor 1300, a particle motion sensor 1303, and a pressure sensor 1305, as is conceptually shown in FIG. 13. The acoustic sensor 1300 may be implemented using, e.g., a hydrophone such as is known to the art. The acoustic sensor 1300 acquires the "pressure data" 227 indicating the magnitude and time of arrival for passing wavefronts in a conventional manner well known to the art. The pressure sensor 1305 record pressure as a function of time for use in determining the height of the water column above the acoustic sensor 1300 as is described more fully below.

The particle motion sensors 1303 measure not only the magnitude of passing wavefronts, but also their direction. The particle motion sensor 1303 may be implemented using, for example, at least two co-located sensors in different (preferably orthogonal) directions in the plane perpendicular to the inline axis of the streamer 1212. Suitable particle motion sensors are disclosed in:

U.S. application Ser. No. 10/792,511, entitled "Particle Motion Sensor for Marine Seismic Sensor Streamers," filed Mar. 3, 2004, in the name of the inventors Stig Rune Lennart Tenghamn and Andre Stenzel (published Sep. 8, 2005, as Publication No. 2005/0194201);

U.S. application Ser. No. 10/233,266, entitled "Apparatus and Methods for Multicomponent Marine Geophysical Data Gathering," filed Aug. 30, 2002, in the name of the inventors Stig Rune Lennart Tenghamn et al. (published Mar. 4, 2004, as Publication No. 2004/0042341); and U.S. Pat. No. 3,283,293, entitled "Particle Velocity Detector and Means for Canceling the Effects of Motional Disturbances Applied Thereto," naming G. M. Pavey, Jr. et al. as inventors, and issued Nov. 1, 1966.

Any suitable particle motion sensor known to the art may be used to implement the particle motion sensor 1303. Thus, it would be possible to distinguish data representing upwardly propagating wavefronts, such as the reflections 1235, from the downwardly propagating wavefronts, such as the multiple reflection 1250.

As noted elsewhere, particle velocity is but one vector quantity associated with the passing wavefront that may be used. Thus, in some embodiments, instead of the particle velocity, the particle acceleration may be measured using a suitable accelerometer. Suitable accelerometers include geophone accelerometers ("GACs"), such as are commonly known in the art for use in land-based seismic surveying, or micro electromechanical systems ("MEMS") accelerometer. Suitable MEMS accelerometers are known to the art. For example, MEMS accelerometers are disclosed in:

U.S. Pat. No. 5,723,790, entitled "Monocrystalline Accelerometer and Angular Rate Sensor and Methods for Making and Using Same", issued Mar. 3, 1998, and naming Gert Andersson as inventor ("the '790 patent")

U.S. patent application Ser. No. 11/042,721, entitled "System and Method for a Three-Axis MEMS Accelerometer", filed Jun. 24, 2005, published Jul. 28, 2005, as Publication No. 2005/0160814 A1, and naming Vladimir Vaganov and Nikolai Belov as inventors;

U.S. patent application Ser. No. 11/000,652, entitled "Micro-Machined Electromechanical System (MEMS) Accelerometer Device Having Arcuately Shaped Flexures", filed Nov. 30, 2004, published Sep. 15, 2005, as Publication No. 2005/0202585 A1, and naming Mark H. Eskridge as inventor; and International Patent Application Serial No. PCT/GB2004/001036, entitled "MEMS Accelerometers", filed Mar. 11, 2004, published Sep. 25, 2004, as Publication No. WO 2004/081583, and naming Diana Hodgins and Joseph Mark Hatt as inventors.

However, any suitable accelerometer known to the art may be used.

The streamer 1212 also provides a way to measure or detect the orientation of the particle motion sensors 1303 with respect to the sea-surface or gravity field. The particle motion sensor 1303 is ideally oriented to measure in the "true" vertical direction. However, this is frequently not the case, as the streamers 1212 can rotate and twist during the seismic survey 1200. It is therefore desirable to know the true orientation of the particle motion sensor 1303 relative to the vertical so that a correction may be effected during processing.

This may be done using inclinometers, for example. The inclinometer may be a single and/or dual axis accelerometer formed on an integrated circuit chip, such as the ADXL 103/203 single/dual axis accelerometer produced by Analog Devices or that disclosed in U.S. application Ser. No. 10/623,904, entitled "Cable Motion Detection", filed Jul. 21, 2003, in the name of Kenneth E. Welker and Nicolas Goujon, and commonly assigned herewith. Alternatively, the DC component from MEMS sensors in embodiments where MEMS sensors are used. Note that this means, in embodiments using MEMS sensors, there may not be a separate pressure sensor 1305.

Some embodiments may employ additional sensors over and above those shown. Some embodiments may employ a third sensor to measure the inline particle velocity. If a third particle motion sensor measuring the inline particle velocity is present an extra inclinometer measuring the inline angle of the sensor with respect to the sea-surface is included.

In general, it is desirable for the measurements of the particle motion sensors 1303 be taken as close to the point the seismic data is acquired by the acoustic sensors 1300 as is reasonably possible to reduce pre-processing. However, it is not necessary that the particle motion sensor 1303 be positioned together with the acoustic sensor 1300 within the sensor sonde 1224 as is the case for the illustrated embodiment. Alternative embodiments may position the particle motion sensors 1303 on the streamer 1212 without regard to the positions of the acoustic sensors 1300, even to the extent that the two groups of sensors may employ different inline spacings along the streamer 1212. In these circumstances, vertical motion data can be interpolated inline during processing using techniques known to the art.

The sensors of the instrumented sondes 1224 then transmit data representative of the detected quantity over the electrical leads of the streamer 1212. The data from the acoustic sensors 1300, the particle motion sensors 1303, and the sensor orientation sensors 1305 may be transmitted over separate lines. However, this is not necessary to the practice of the invention. Size, weight, and power constraints will typically make separate lines undesirable. The data generated will therefore need to be interleaved with the seismic data. Techniques for interleaving information with this are known to the art. For instance, the two kinds of data may be multiplexed. Any suitable technique for interleaving data known to the art may be employed.

Referring now to FIG. 12A-FIG. 12B and FIG. 13, the data generated by the sensors of the instrumented sondes 1224 is transmitted over the seismic cable to the computing apparatus 1209. As those in the art will appreciate, a variety of signals are transmitted up and down the streamer 1212 during the seismic survey. For instance, power is transmitted to the electronic components (e.g., the acoustic sensor 1300 and particle motion sensor 1303), control signals are sent to positioning elements (e.g., the deflectors 1218, birds 1222), and data is transmitted back to the survey vessel 1210. To this end, the streamer 1212 provides a number of lines (i.e., a power lead 1306, a command and control line 1309, and a data line 1312) over which these signals may be transmitted. Those in the art will further appreciate that there are a number of techniques that may be employed that may vary the number of lines used for this purpose. Furthermore, the streamer 1212 will also typically include other structures, such as strengthening members (not shown), that are omitted for the sake of clarity.

The survey vessel 1206 tows the array 1203 across the survey area in a predetermined pattern. The predetermined pattern is basically comprised of a plurality of "sail lines" along which the survey vessel 1206 will tow the array 1203. Thus, at any given time during the survey, the survey vessel 1206 will be towing the array 1203 along a predetermined sail line 1253. The seismic source 1215 generates a plurality of seismic survey signals 1225 in accordance with conventional practice as the survey vessel 1206 tows the array 1203.

The seismic survey signals 1225 propagate and are reflected by the subterranean geological formation 1230. The geological formation 1230 presents a seismic reflector 1245. As those in the art having the benefit of this disclosure will appreciate, geological formations under survey can be much more complex. For instance, multiple reflectors presenting multiple dipping events may be present. FIG. 12A-FIG. 12B omit these additional layers of complexity for the sake of clarity and so as not to obscure the present invention. The sensors 1300, 1303 detect the reflected signals 1235 from the geological formation 1230 while the sensor 1305 detects the sensor's orientation relative to the gravitational field or water surface.

The sensors 1300, 1303 (shown in FIG. 13) in the instrumented sondes 1224 then generate data representative of the reflections 1235 and the associated particle motion, and the seismic data is embedded in electromagnetic signals. The sensor 1305 generates data representative of the pressure exerted by the water above the sensor 1305. The signals generated by the sensors 1300, 1303, and 1305 are communicated to the computing apparatus 1209. The computing apparatus 1209 collects the data for processing. The computing apparatus 1209 is centrally located on the survey vessel 1210. However, as will be appreciated by those skilled in the art, various portions of the computing apparatus 1209 may be distributed in whole or in part, e.g., across the seismic recording array 1205, in alternative embodiments.

The computing apparatus 1209 may process the seismic data itself, store the seismic data for processing at a later time, transmit the seismic data to a remote location for processing, or some combination of these things. Typically, processing occurs on board the survey vessel 1206 or at some later time rather than during the seismic survey 1200 because of a desire to maintain production. The data may therefore be stored on a portable magnetic storage medium (not shown) or wirelessly transmitted from the survey vessel 1206 to a processing center 1240 for processing in accordance with the present invention. Typically, in a marine survey, this will be over satellite links 1242 and a satellite 1243. Note that some alternative embodiments may employ multiple data collection systems 1220.

In the illustrated embodiment, the acquired seismic data 225 is processed at the processing center 1240. The processing center 1240 will typically house a distributed computing system such as the computing system 800 shown in FIG. 8. Thus, a user (not shown) invokes the application 265 which then accesses the acquired seismic data 225 and processes it. Referring now to FIG. 1, as was described more fully above, the application 265:

decomposes (at 105) a recorded wavefield represented by the seismic data set;
 isolates (at 110) a noise component in the recorded wavefield from the relationship of the decomposed upgoing and downgoing components at the free surface; and
 removes (at 115) the isolated noise component from the recorded wavefield.

The processed multicomponent seismic data 226 is then stored.

The present invention is not limited by the temporal relationship between acquisition and processing. In the embodiment illustrated immediately above, the processing occurs relatively contemporaneously—e.g., several days to weeks after acquisition. In the embodiment shown in FIG. 9A-FIG. 9B, processing actually occurs at the time of acquisition. In other embodiments, the acquired seismic data 225 may be "legacy" data—that is, data archived from an old survey. Legacy data, however, will be multicomponent seismic data and have sufficient information associated with it so that the height of the water column above the sensor can be determined.

The efficacy of the present invention has been established using a real data sample. In FIG. 14A, a pressure trace 1400 ("P") and a particle velocity trace 1403 ("Z"), only one of each indicated, are shown for each of nine consecutive shots. As explained previously, the vertical component of particle velocity has been scaled by the impedance of the water to allow direct comparison and combination with the pressure data. In addition calibration has been applied to the vertical component. Both P and Z have been 3 Hz low-cut filtered. Note that on the vertical component of particle velocity, the reflection signal is completely masked by low-frequency vibration noise. The vibration noise appears to be absent on the pressure data.

In FIG. 14B, a pressure trace 1406 ("P") and a vibration noise estimate 1409 ("N"), only one of each indicated, determined using the new method, are shown for each of the nine shots. In FIG. 14C, the pressure trace 1412 and the resulting vertical component trace 1415 of particle velocity with the vibration noise estimate subtracted, only one of each indicated, are shown. The plotting scale is $\frac{1}{12}$ of the plots in FIG. 14A and FIG. 14B. Note that the low-frequency vibration noise has been removed and underlying reflection data has reappeared.

The present invention therefore provides a method and apparatus for acquiring and/or processing seismic data to yield an improved data set which, in turn, will yields results in a seismic data analysis. The technique estimates vibration noise (or any other type of noise that does not obey the acoustic equation of motion) on particle motion sensors in multi-component marine seismic streamers. The method assumes that the noise is pre-dominantly recorded on one of the components, or correlated between the components with a known coefficient and combines a free surface reflection operator/redatuming with acoustic wavefield decomposition to isolate a term involving only the noise. This term is then directly solved for the noise. The method requires knowledge about the height of the free surface above the receivers.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

We claim:

1. A computer-implemented method for mitigating noise in multicomponent, marine seismic data, comprising:

on a computer, determining a noise component in a set of multicomponent seismic data representing a recorded wavefield from the relationship at the free surface of an upgoing component and a downgoing component decomposed from the recorded wavefield, wherein the noise is any information that does not obey the acoustic equation of motion; and removing the determined noise component from the seismic data.

2. The computer-implemented method of claim 1, wherein determining the noise component includes:

decomposing a recorded wavefield into an upgoing component and a downgoing component; and isolating a noise component in the recorded wavefield from the relationship of the decomposed upgoing and downgoing components at the free surface.

3. The computer-implemented method of claim 2, wherein isolating the noise component includes:

processing at least one of the decomposed upgoing and downgoing components such that the upgoing and downgoing components are at a common depth and propagating in the same direction;

taking the difference between the processed upgoing and downgoing components to find the noise component; and solving the found noise component for the noise.

4. The computer-implemented method of claim 3, wherein the processing includes:

forward propagating the upgoing component from its collection depth to the free surface;

applying a reflection coefficient to the forward propagated upgoing component at the free surface to obtain a reflected equivalent; and forward propagating the reflected equivalent to the common depth.

5. The computer-implemented method of claim 4, further comprising propagating the downgoing component to the common depth.

6. The computer-implemented method of claim 4, wherein the reflection coefficient is represented by $e^{i\omega t_{refl}}$, wherein $\omega$=the frequency of the acoustic signal; and $t_{refl}$=the vertical two-way traveltime of the wavefield through the water layer.

7. The computer-implemented method of claim 3, wherein the processing includes:

backward propagating the downgoing component from its collection depth to the free surface;

applying an inverse reflection coefficient to the backward propagated downgoing component at the free surface to obtain a reflected equivalent; and backward propagating the reflected equivalent to the common depth.

8. The computer-implemented method of claim 7, further comprising propagating the upgoing component to the common depth.

9. The computer-implemented method of claim 7, wherein the reflection coefficient is represented by $(e^{i\omega t_{refl}})^{-1}$, wherein $\omega$=the frequency of the acoustic signal; and $t_{refl}$=the vertical two-way traveltime of the wavefield through the water layer.

10. The computer-implemented method of claim 3, wherein the found noise component is represented by:

$$N = \frac{2(\hat{P}^{down} - \tilde{P}^{down})}{1 - e^{i\omega t_{refl}}}$$

wherein:
$\hat{P}^{down}$=a second estimate of the downgoing component of the recorded wavefield;
$\tilde{P}^{down}$=the estimated downgoing component of the composite wavefield;
$e^{i\omega t_{refl}}$=the reflection coefficient;
$\omega$=the frequency of the acoustic signal; and
$t_{refl}$=the vertical two-way traveltime of the wavefield through the water layer.

11. The computer-implemented method of claim 2, wherein isolating the noise component includes:
redatuming one of the upgoing and downgoing components to the free surface;
reflecting the redatumed component at the free surface to obtain a reflected equivalent;
redatuming the reflected equivalent to the common depth.

12. The computer-implemented method of claim 11, further comprising redatuming the other component to the common depth.

13. The computer-implemented method of claim 2, wherein isolating the noise component includes:
redatuming the decomposed upgoing and downgoing components to the free surface;
adding the redatumed upgoing and downgoing components to find the noise component; and
solving for the found noise component.

14. The computer-implemented method of claim 13, wherein the found noise component is represented by:

$$N = \frac{2(\hat{P}^{down} - \tilde{P}^{down})}{1 - e^{i\omega t_{refl}}}$$

wherein:
$\hat{P}^{down}$=a second estimate of the downgoing component of the recorded wavefield;
$\tilde{P}^{down}$=the estimated downgoing component of the composite wavefield;
$e^{i\omega t_{refl}}$=the reflection coefficient;
$\omega$=the frequency of the acoustic signal; and
$t_{refl}$=the vertical two-way traveltime of the wavefield through the water layer.

15. The computer-implemented method of claim 1, wherein the decomposed upgoing and downgoing components are represented by:

$$\tilde{P}^{down} = \frac{1}{2}(P - Z) = P^{down} - \frac{1}{2}N, \text{ and}$$

$$\tilde{P}^{up} = \frac{1}{2}(P + Z) = P^{up} + \frac{1}{2}N$$

wherein:
$\tilde{P}^{down}$=the estimated downgoing component of the composite wavefield;
$\tilde{P}^{up}$=the estimated upgoing component of the composite wavefield;
P=the sensed composite pressure wavefield;
$P^{up}$=the sensed upgoing component of the composite wavefield;
$P^{down}$=the sensed downgoing component of the composite wavefield;
Z=the sensed vertical velocity; and
N=the noise component of the sensed vertical velocity.

16. A method for mitigating noise in seismic data comprising:
acquiring a set of multicomponent seismic data in a marine survey; and
on a computer, removing a noise component in the seismic data determined from the relationship of the decomposed upgoing and downgoing components at the free surface, wherein the noise is any information that does not obey the acoustic equation of motion.

17. The method of claim 16, wherein acquiring the multicomponent seismic data in the marine survey includes acquiring the multicomponent seismic data with an over and under array.

18. The method of claim 16, further comprising determining the noise component.

19. The method of claim 18, wherein determining the noise component includes:
decomposing a recorded wavefield into an upgoing component and a downgoing component; and
isolating a noise component in the recorded wavefield from the relationship of the decomposed upgoing and downgoing components at the free surface.

20. The method of claim 19, wherein isolating the noise component includes:
processing at least one of the decomposed upgoing and downgoing components such that the upgoing and downgoing components are at the same depth and propagating in the same direction;
taking the difference between the processed upgoing and downgoing components to find the noise component; and
solving the found noise component for the noise.

21. The method of claim 19, wherein isolating the noise component includes:
redatuming one of the upgoing and downgoing components to the free surface;
reflecting the redatumed component at the free surface to obtain a reflected equivalent;
redatuming the reflected equivalent to a predetermined depth.

22. The method of claim 19, wherein isolating the noise component includes:
redatuming the decomposed upgoing and downgoing components to the free surface;
adding the processed upgoing and downgoing components to find the noise component; and
solving for the found noise component.

23. A apparatus, comprising:
a marine survey system capable of acquiring multicomponent seismic data; and
a computing apparatus programmed to remove noise component in the seismic data determined from the relationship at the free surface of an upgoing component and a downgoing component decomposed from the recorded wavefield, wherein the noise is any information that does not obey the acoustic equation of motion.

24. The apparatus of claim 23, wherein the marine survey system includes a towed-array marine survey system.

25. The apparatus of claim 24, wherein the towed-array marine survey system comprises an over/under acquisition system.

26. The apparatus of claim 23, wherein the marine survey system includes a survey vessel.

27. The apparatus of claim 23, wherein the marine survey system includes a seabed survey system.

28. The apparatus of claim 23, wherein the marine survey system includes an over/under acquisition system.

29. The apparatus of claim 23, wherein the computing apparatus is a centralized computing apparatus.

30. The apparatus of claim 23, wherein the computing apparatus is a distributed computing system.

31. The apparatus of claim 23, wherein the computing apparatus is capable of decomposing the recorded wavefield.

32. The apparatus of claim 23, wherein the computing apparatus is capable of determining the noise component.

* * * * *